United States Patent [19]

Tai et al.

[11] Patent Number: 4,959,730
[45] Date of Patent: Sep. 25, 1990

[54] FALSE DENSITY CONTOUR SUPPRESSION USING RANDOMLY MODIFIED INPUT SIGNALS FOR COMPARISON TO THRESHOLD VALUES

[75] Inventors: Hwai T. Tai, Rochester; Yee S. Ng, Fairport, both of N.Y.

[73] Assignee: Eastman Kodak Company, Rochester, N.Y.

[21] Appl. No.: 459,496

[22] Filed: Jan. 2, 1990

[51] Int. Cl.$^5$ .......................... H04N 1/23; H04N 1/40
[52] U.S. Cl. ..................................... 358/298; 358/456; 358/460; 358/465
[58] Field of Search ............... 358/298, 447, 456, 462, 358/464, 457, 460, 455, 465, 466, 445, 459; 382/50, 54, 56

[56] References Cited

U.S. PATENT DOCUMENTS

| | | | |
|---|---|---|---|
| 4,184,206 | 1/1980 | Harano | 358/445 |
| 4,245,258 | 1/1981 | Holladay | 358/460 |
| 4,553,173 | 11/1985 | Kawamura | 358/298 |
| 4,654,721 | 3/1987 | Goertzel et al. | 358/459 |
| 4,821,109 | 4/1989 | Roe | 358/456 |

Primary Examiner—Bruce A. Reynolds
Assistant Examiner—Scott A. Rogers
Attorney, Agent, or Firm—Milton S. Sales

[57] ABSTRACT

False contouring of a screened halftone image without including more sub-elements in each cell, increasing the size of each cell, or decreasing the screen frequency of the image is accomplished by assigning to each sequential sub-element of a halftone cell a weighted probability of being "ON" in accordance with the value of the associated input signal.

5 Claims, 5 Drawing Sheets

FIG. 8

| ROW \ COLUMN | 1 | 2 | 3 | 4 | 5 | 6 | 7 | 8 | 9 | 92 | 93 | 94 | 95 | 96 | 97 | 98 | 99 | 100 |
|---|---|---|---|---|---|---|---|---|---|---|---|---|---|---|---|---|---|---|
| 1 | 0 | 0 | 0 | 0 | 0 | 0 | 1 | 0 | 0 | 0 | 0 | 0 | 1 | 0 | 0 | 0 | 0 | 0 |
| 2 | 1 | 0 | 0 | 1 | 0 | 0 | 0 | 0 | 0 | 0 | 1 | 0 | 0 | 0 | 1 | 0 | 0 | 0 |
| 3 | 0 | 1 | 0 | 0 | 0 | 1 | 0 | 0 | 0 | 0 | 0 | 1 | 0 | 0 | 0 | 0 | 0 | 1 |
| 4 | 0 | 0 | 0 | 1 | 0 | 0 | 1 | 0 | 0 | 1 | 1 | 0 | 0 | 1 | 0 | 0 | 0 | 1 |
| 5 | 1 | 0 | 0 | 1 | 0 | 0 | 1 | 0 | 0 | 1 | 0 | 0 | 0 | 1 | 0 | 0 | 1 | 0 |
| 6 | 0 | 1 | 0 | 1 | 0 | 1 | 0 | 1 | 0 | 1 | 0 | 0 | 0 | 1 | 0 | 0 | 0 | 0 |
| 7 | 1 | 1 | 1 | 0 | 0 | 1 | 0 | 1 | 0 | 0 | 1 | 0 | 0 | 1 | 0 | 1 | 0 | 0 |
| 8 | 0 | 0 | 1 | 1 | 0 | 1 | 0 | 1 | 0 | 0 | 0 | 1 | 0 | 1 | 0 | 1 | 1 | 0 |
| 9 | 1 | 1 | 0 | 0 | 1 | 0 | 1 | 0 | 0 | 1 | 1 | 0 | 1 | 1 | 0 | 1 |   | 0 |
| 10 | 0 | 0 | 1 | 1 | 1 | 1 | 0 | 1 |   | 0 | 1 | 1 | 0 | 1 | 0 | 1 | 1 | 0 |
| 11 | 0 | 1 | 0 | 1 | 1 | 0 | 0 | 0 | 1 | 1 | 0 | 0 | 1 | 0 | 0 | 0 | 0 | 0 |
| 45 | 0 | 1 | 1 | 1 | 1 | 0 | 1 | 0 | 1 | 0 | 1 | 1 | 0 | 1 | 1 | 1 | 0 | 1 |
| 46 | 1 | 0 | 1 | 1 | 0 | 1 | 1 | 0 | 1 | 1 | 1 | 1 | 0 | 1 | 1 | 1 | 1 | 1 |
| 47 | 1 | 1 | 1 | 1 | 0 | 1 | 1 | 1 | 1 | 1 | 1 | 0 | 1 | 1 | 1 | 1 | 1 | 1 |
| 48 | 1 | 1 | 1 | 1 | 1 | 1 | 1 | 1 | 0 | 1 | 1 | 1 | 1 | 1 | 0 | 1 | 1 | 1 |
| 49 | 1 | 1 | 1 | 1 | 1 | 1 | 1 | 1 | 1 | 1 | 1 | 1 | 1 | 1 | 1 | 1 | 1 | 1 |

FALSE DENSITY CONTOUR SUPPRESSION USING RANDOMLY MODIFIED INPUT SIGNALS FOR COMPARISON TO THRESHOLD VALUES

BACKGROUND OF THE INVENTION

1. Technical Field

This invention relates generally to encoding pictorial imagery for reproduction on binary display and/or printing systems, and more particularly to suppressing false density contours caused by an insufficient number of output gray levels in the reproduction system.

2. Background Art

Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images are simulated by organizing groups of sub-elements into $j \times k$ matrix halftone cells, where j and k are positive integers. The halftone cells have gray level capabilities equal to the number of sub-elements in the cell plus one.

Halftone image processing algorithms are evaluated in part by their capability to deliver a complete gray scale at normal viewing distances. The capability of a particular process to reproduce high frequency renditions (fine detail) with high contrast modulation makes that procedure superior to one which reproduces such fine detail with lesser or no output contrast.

Another measure of image processing algorithm merit is the tendency to produce visual details in the output image that are not part of the original image, but are the result of the image processing algorithm. Such details are called artifacts, and include moire patterns, false contours, and false textures. Moire patterns are false details created most often by the beating between two relatively high frequency processes resulting in a signal whose spacial frequency is low enough to be seen by the viewer. False textures are artificial changes in the image texture which occur when input gray levels vary slowly and smoothly and the output generates an artificial boundary between the textural patterns for one gray level and the textural patterns for the next gray level. False contours are the result of gray scale quantization steps which are sufficiently large to create a visible density step when the input image is truly a smooth, gradual variation from one to the other.

Briefly, several of the commonly used processing algorithms include fixed level thresholding, adaptive thresholding, orthographic tone scale fonts, and electronic screening. The present invention is concerned with the latter, electronic screening, and with suppressing false contours in screened images.

There are many formats for electronic halftone cells at various screen angles and screen frequencies. FIG. 1 shows a sequence number matrix for a halftone screen design at 97 lines per inch ruling with a 400 dpi at 400×400 addressable points per square inch. There are eighteen levels of gray (17 sub-elements plus white) associated with each halftone cell which is enclosed within the thick lines in the figure. The numeral that is associated with each sub-element within a halftone cell is the sequence number that the sub-elements within the cell is filled sequentially as the density in the cell increases. Each halftone cell is stacked to form a halftone screen with screen angle of 104°.

A problem exists with the number of density levels attainable with a limited resolution and acceptable screen frequency. Eighteen levels is not generally sufficient; more gradations being preferred to suppress false contouring. One way to get more gray levels is to include more sub-elements in a cell by increasing the size of the cell, but this reduces the number of lines per inch and decreases the screen frequency to a visible level. That is, the more sub-elements in a cell, the more gray levels can be reproduced, but larger cells become more observable and objectionable.

DISCLOSURE OF INVENTION

It is an object of the present invention to suppress false contouring of a screened halftone image without including more sub-elements in each cell.

It is another object of the present invention to suppress false contouring of a screened halftone image without increasing the size of each cell.

It is still another object of the present invention to suppress false contouring of a screened halftone image without decreasing the screen frequency of the image.

It is yet another object of the present invention to suppress false contouring of a screened halftone image by changing the threshold level associated with each sub-element in a halftone cell in accordance with the value of the input variable.

It is another object of the present invention to suppress false contouring of a screened halftone image by assigning each sub-element a weighted probability of being printed in accordance with the value of the input variable.

These and other objects of the present invention are realized by apparatus which includes means for converting a continuous tone original image into a series of input signals whose values are representative of the gray level of successive picture elements of the original image; means for printing groups of sub-elements sequentially organized into two dimensional matrix halftone cells, each halftone cell being associated with one of the input signals; and means for assigning to each sequential sub-element of a halftone cell a weighted probability of being "ON" in accordance with the value of the associated input signal.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 8 is a schematic view of a memory device according to one embodiment of the present invention.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 2:
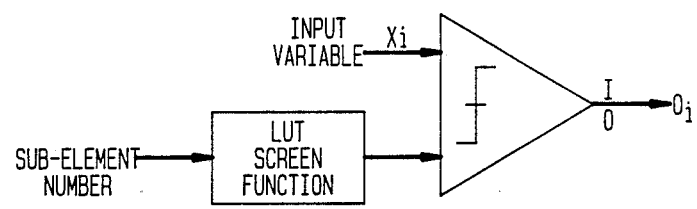
FIG. 2 is a schematic view of the electronic screening process known in the prior art.

FIG. 2 shows a schematic view of the electronic screening process. Signal $X_i$ represents the lightness or gray level information at a pixel sampling point "i" of an image. Input signal $X_i$ of sample image picture elements is compared with a series of threshold values $C_i$ selected in sequential order from a lookup table of two-dimensional matrix values defined to be the halftone cell threshold set, and a print/no-print decision is made. The series of threshold values and their arrangement within the threshold set determine the gray scale range, the frequency, angle, and other properties of the halftone pictorial image. Each threshold level $C_i$ is determined by a comparison $j \times k$ matrix. When the input signal $X_i$ exceeds the threshold level $C_i$, the corresponding sub-element is determined to have a print level or logic level "ONE". By comparing the input signal $X_i$ with the threshold levels, $j \times k$ output signals $O_i$ are produced. A density pattern consisting of a combination of $j \times k$ sub-elements is obtained by dividing each picture element into $j \times k$ sub-elements and systematically printing them or leaving them blank.

Figure 1:
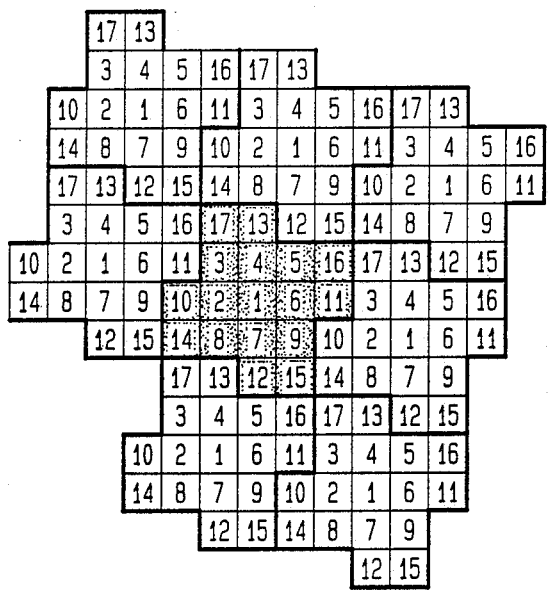
FIG. 1 is a typical electronic halftone function unit cell known in the prior art.
Figure 3:
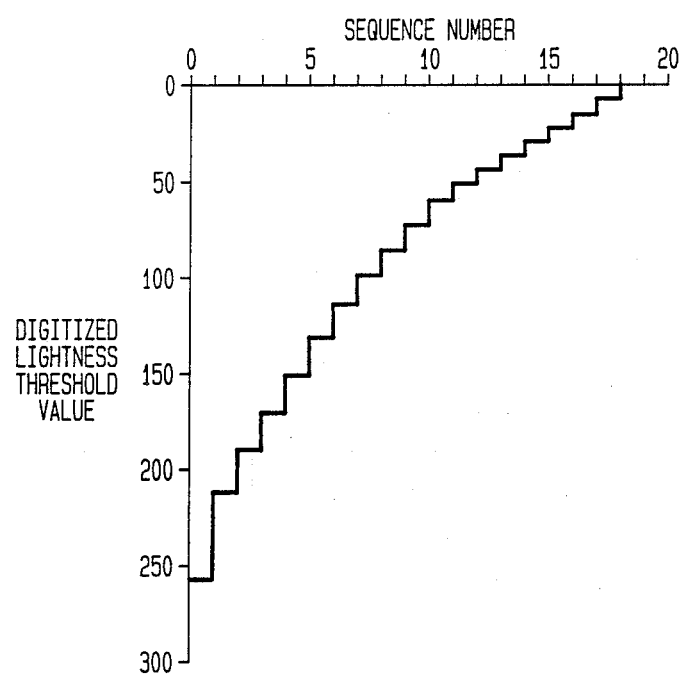
FIG. 3 is a plot of the apparent output lightness produced by the sequential activation of the unit cells of FIG. 2.

FIG. 3 is a plot of the apparent output lightness threshold values "$L_i$" produced by the sequential activation of the unit cells of FIG. 1 plotted against the sequence number of the halftone matrix cell, where:

$$L_{it} = 25.4(100 \ R_i 0.1)^{0.33} - 16$$

and $R_i$ is the input reflectance. In lightness space, equal step changes have equal visual impact.

As can be seen from FIG. 3, in a halftone system with limited numbers of addressable sub-elements per halftone cell, and if the threshold values are fixed in the output threshold matrix, there will be significant output density contouring in the low density (high lightness) region. If, for example, the input pixel lightness value at the sixth sequence number (threshold value=117) is at a value of 118, this output sub-element is not turned "ON". If the input pixel lightness value is at a value of 117, this output sub-element is turned "ON"; thereby creating an output density jump. This output density jump occurs when the input pixel lightness value is near a threshold value on the output threshold matrix, thereby creating density contouring in broad, flat field areas. In color reproductions, hue shift can sometimes occur due to this problem.

According to the present invention, instead of using a fixed threshold value for a particular sequence number, each sequence number is assigned a probability that the associated sub-element is turned "ON" for a given lightness value. This eliminates the sudden jump in density when the input pixel lightness value is close to an output threshold value.

Figure 4:
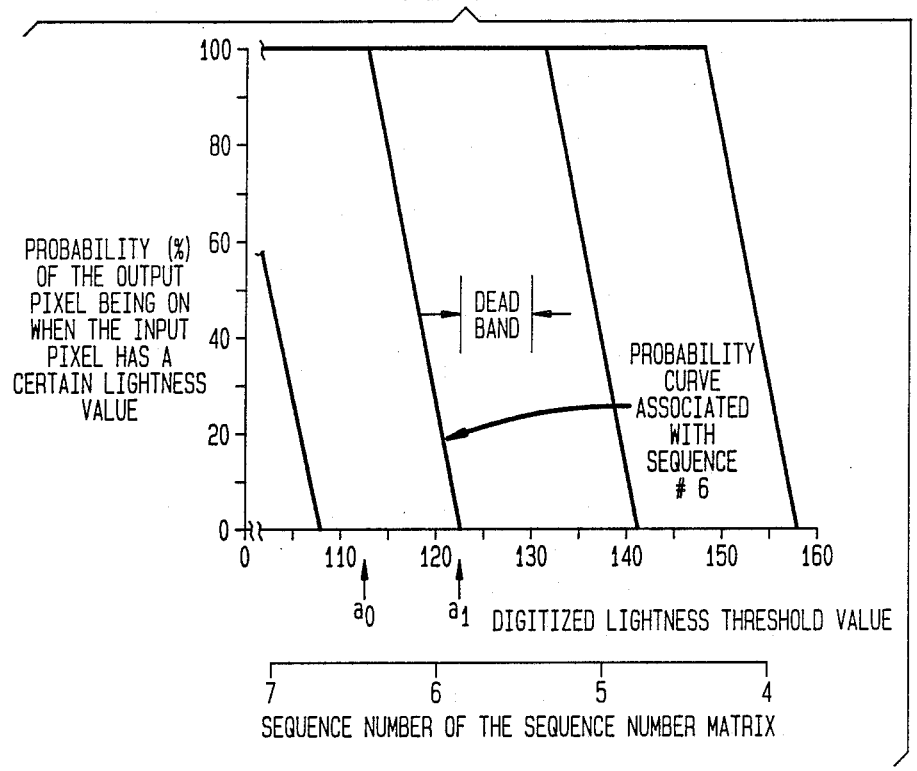
FIG. 4 is a probability curve of the output sub-element being "ON" when the input pixel value is at a certain lightness.

FIG. 4 is a portion of a probability curve of the output sub-element being "ON" when the input pixel value is at a certain lightness. One way to provide a probability of turning "ON" a particular sub-element is to allow a 50% probability sub-element turn-on rate at a predetermined lightness value, and to assume an equal probability distribution on each side of the threshold value from 0% to 100%. This would preserve the tone reproduction of the system in a broad area, and would, in effect distribute the output threshold values into spacial frequency space to give a sensation of gray that is not available when the number of addressable sub-elements within a halftone cell is limited.

In the illustrated example of FIG. 4, a 50% probability of turning "ON" the sub-element at sequence number 6 is set at an input pixel lightness value of 117 (117 was chosen for this example because it was the threshold value of sequence number 6 in FIG. 4). A uniform probability distribution is assumed on both sides of the 50% position to preserve tone reproduction. In this case a linear distribution is assumed, although it does not need to be. At an input lightness value of less than 112, the probability of that sub-element being "ON" is 100%. Similarly, at an input lightness value of more than 123, the probability of that output sub-element being "ON" is 0%. Between these two values, the probability varies linearly.

The probability distributions of each threshold value can overlap that of the neighboring threshold values. Alternatively, as shown in FIG. 4, it may be desirable to leave a "dead band" between the probability distributions to reduce granularity; especially when there are very few gray levels available (very few addressable sub-elements) within a halftone cell. The width of the dead band is a trade off between contouring and granularity, and less dead band is needed as the number of gray levels increase to, say, about 32 gray levels; beyond which generally no dead band is needed.

Figure 5:
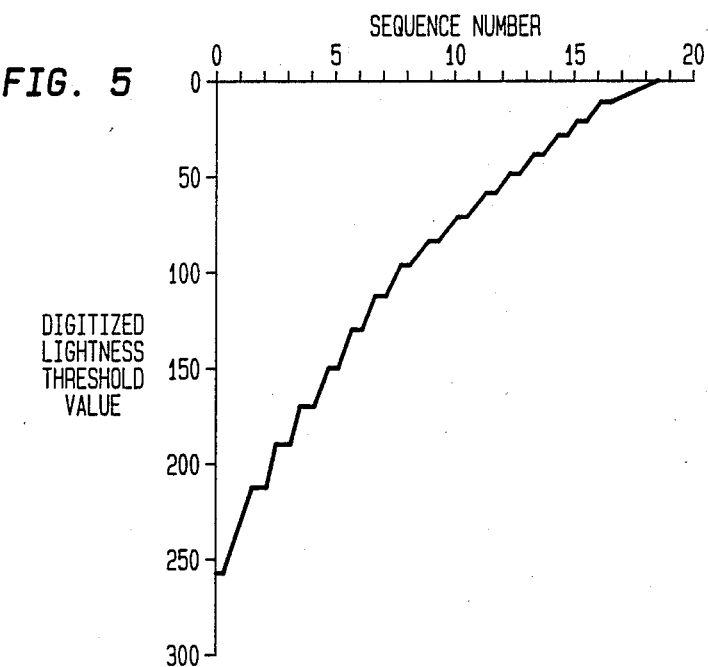
FIG. 5 is a plot of digitized lightness threshold values verses sequence numbers of a halftone cell according to the present invention.

FIG. 5 is a plot of the digitized threshold values verses the sequence number for the latter case, where a dead band is provided. Note that the sudden jumps in lightness threshold values as a function of sequence number apparent in FIG. 4 have been greatly smoothed in FIG. 5. As a result, the density contouring problem has been greatly reduced.

Figure 6:
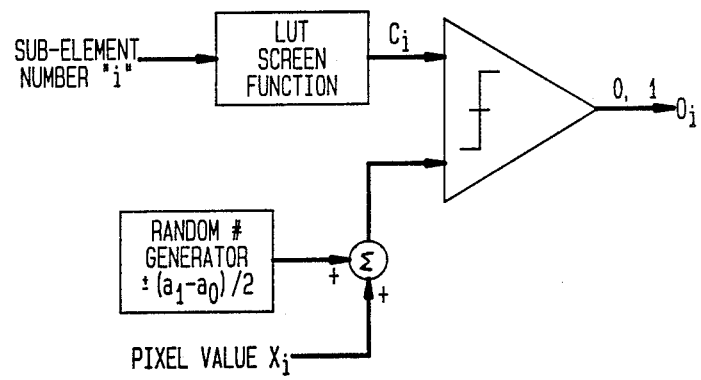
FIG. 6 is a schematic view of one embodiment of the electronic screening process according to the invention.

FIG. 6 is a schematic view of one embodiment of specific components, and the way those components are interconnected, for effecting false density contour suppression according to the present invention. Signal $X_i$ represents the lightness or gray level information at a pixel sampling point "i" of an image. A randomly generated value between $\pm(a_{il} - a_{iO})/2$ is added to input signal $X_i$, and the sum is compared with a series of threshold values $C_i$ selected in sequential order from a lookup table of two-dimensional matrix values defined to be the halftone cell threshold set, and a print/no-print decision is made. The series of threshold values and their arrangement within the threshold set determine the gray scale range, the frequency, angle, and other properties of the halftone pictorial image. Each threshold level $C_i$ is determined by a comparison $j \times k$ matrix. When the input signal sum exceeds the threshold level $C_i$, the corresponding sub-element output $O_i$ is determined to have a print level (logic level "ONE"). A density pattern consisting of a combination of j×k sub-elements is obtained by dividing each picture element into j×k sub-elements and systematically printing them or leaving them blank.

Figure 7:
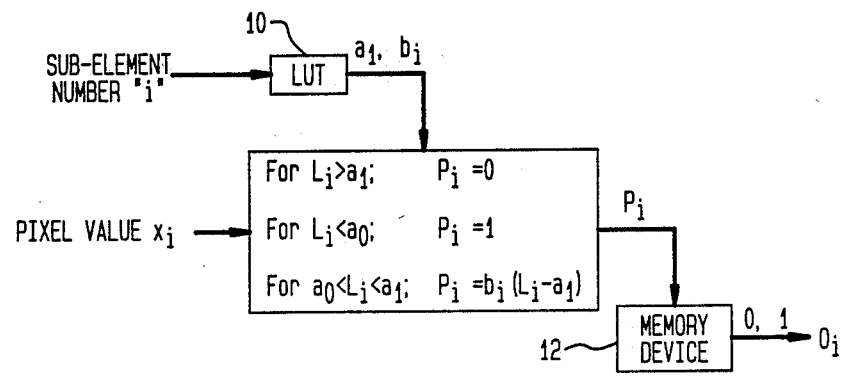
FIG. 7 is a schematic view of another embodiment of the electronic screening process according to the present invention.

FIG. 7 is a schematic view of another embodiment of specific components, and the way those components are interconnected, for effecting false density contour suppression according to the present invention without having to use a random number generator in real time.

When a sub-element of the halftone cell is to be printed, that sub-element's number "i" is inputted to a table look-up 10. The look-up table does not contain a threshold screen function value as in the conventional system of FIG. 2. Rather, if the probability factors are linear as shown in FIG. 4, look-up table 10 provides the intercept "$a_{il}$" (the highest lightness value for the probability function for sub-element "i") and the slope $b_i$ of the line between $a_{i0}$ (the lowest lightness value for the probability function for sub-element "i") and $a_{il}$, where $$a_{i0} = a_{il} + 1/b_i.$$

The intercept $a_{il}$ and slope $b_i$ of the sub-element in question, along with the lightness value $L_i$, are used to calculate a probability factor $P_i$ according to the following equations:

For $L_i > a_{il}$; $P_i = 0$

For $L_i < a_{i0}$; $P_i = 1$

For $a_{i0} < L_i < a_{il}$; $P_i = b_i(L_i - a_{il})$

Probability factor $P_i$ is inputted to a memory device 12 which can be pictured as a table with "j" number of rows and "k" number of columns. The table is made up of "print" and "no-print" decisions. Each row represents a different probability factor that a sub-element will be printed.

For example, FIG. 8 is a memory location table for memory device 12 of FIG. 7. There are 49 rows and 100 columns. The 49 rows of memory represent a 2probability increment from 2% to 98% sub-element "ON" probability. Within each row of memory, there are 100 memory locations which are filled with logical ONEs and ZEROs randomly distributed within the row; with the percent of ONEs equal to the percent probability the sub-element represented by that row will be "ON". For example, a 60% "ON" row will have 60 logical ONEs and 40 logical ZEROs randomly distributed within the row.

Referring back to FIG. 4 an input lightness value of 116 at the output sub-element number location 6 will produce a calculated probability factor $P_i$ of 60%. This value inputted to memory 12 will access the row (in this case row number 30) which is most closely associated with the $P_i$ value. A column (0 to 99) in row 30 is randomly selected (via a random number generator, by shifting the address of the column after each access, or by use of a noise generator and A/D converter to get the random access). The value in that memory location (logical ONE or Zero) represents a randomly generated, 60% probability that the sub-element will be "ON."

While the 49 rows of memory 12 which generate the probability can be used for every sequence number location "i", the values of $a_{i0}$ and $a_{il}$ will of course be different. Also, if one desires a non-linear probability function, a different equation is needed to calculate $P_i$. However, after $P_i$ is calculated, memory 12 can be used to get a weighted value in a random fashion for contour suppression purposes. Further modification to the system can be a different number of memory locations within each row, or a different number of rows, to get different precision.

The invention has been described in detail with particular reference to preferred embodiments thereof, but it will be understood that variations and modifications can be effected within the spirit and scope of the invention.

What is claimed is:

1. Apparatus for suppressing false density contours in halftone reproduction of continuous tone original images, said apparatus comprising:
   means for converting a continuous tone original image into a series of input signals whose values are representative of the gray level of successive picture elements of the original image:
   means for printing groups of sub-elements sequentially organized into two dimensional matrix halftone cells, each halftone cell being associated with one of said input signals; and
   means for assigning to each sequential sub-element of a halftone cell a weighted probability of being "ON" in accordance with the value of the associated input signal, wherein said assigning means is adapted to provide (1) a 50% probability print verses no-print rate for each sub-element at a respective predetermined picture element gray level, and (2) a uniform probability distribution on each side of said predetermined gray level from 0% to 100%.

2. Apparatus as set forth in claim 1 wherein said uniform probability distribution is linear.

3. Apparatus for suppressing false density contours in halftone reproduction of continuous tone original images, said apparatus comprising:
   means for converting a continuous tone original image into a series of input signals whose values are representative of the gray level of successive picture elements of the original image;
   means for printing groups of sub-elements sequentially organized into two dimensional matrix halftone cells, each halftone cell being associated with one of said input signals; and
   means for assigning to each sequential sub-element of a halftone cell a weighted probability of being "ON" in accordance with the value of the associated input signal, wherein the probability distribution of one sub-element of a halftone cell being "ON" overlaps with the probability distribution of the next sequential sub-element cell being "ON".

4. Apparatus for suppressing false density contours in halftone reproduction of continuous tone original images, said apparatus comprising:
   means for converting a continuous tone original image into a series of input signals whose values are representative of the gray level of successive picture elements of the original image;
   means for printing groups of sub-elements sequentially organized into two dimensional matrix halftone cells, each halftone cell being associated with one of said input signals; and
   means for assigning to each sequential sub-element of a halftone cell a weighted probability of being "ON" in accordance with the value of the associated input signal, wherein a dead band is provided between the probability distribution of one sub-element of a halftone cell being "ON" and the probability distribution of the next sequential sub-element cell being "ON".

5. Apparatus for suppressing false density contours in halftone reproduction of continuous tone original images, said apparatus comprising:
- means for converting a continuous tone original image into a series of input signals whose values are representative of the gray level of successive picture elements of the original image;
- means for printing groups of sub-elements sequentially organized into two dimensional matrix halftone cells, each halftone cell being associated with one of said input signals; and
- means for assigning to each sequential sub-element of a halftone cell a weighted probability of being "ON" in accordance with the value of the associated input signal, wherein
- said assigning means includes means for randomly modifying the value of the input signals; and
- said printing means includes (1) means for generating a series of threshold values selected in sequential order from a two dimensional matrix, and (2) means for comparing the threshold value series to the modified value of the input signals.

* * * * *